(12) United States Patent
Nokkonen et al.

(10) Patent No.: US 6,914,944 B1
(45) Date of Patent: Jul. 5, 2005

(54) METHOD AND SYSTEM FOR TESTING THE FUNCTIONING OF A TESTING ALGORITHM IN A DATA TRANSMISSION APPARATUS

(75) Inventors: Esa Nokkonen, Tampere (FI); Jussi Numminen, Turku (FI); Markku Lintinen, Kangasala (FI); Jukka Kinnunen, Tampere (FI); Juha Savolainen, Tampere (FI); Pekka Jokitalo, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/565,759

(22) Filed: May 5, 2000

(30) Foreign Application Priority Data

May 7, 1999 (FI) .................................................. 991062

(51) Int. Cl.$^7$ ............................................... H04B 17/00
(52) U.S. Cl. .................... 375/324; 455/67.14; 702/108; 370/249; 324/612; 324/76.11
(58) Field of Search ................................ 375/224, 228, 375/295; 455/67.11, 67.16, 226.1; 370/241, 247, 249, 252; 702/108, 117, 119, 120, 122; 324/612–614, 76.11

(56) References Cited

U.S. PATENT DOCUMENTS

| | | | |
|---|---|---|---|
| 5,802,105 A | | 9/1998 | Tiedemann, Jr. et al. ... 375/225 |
| 5,870,428 A | * | 2/1999 | Miller et al. ................. 375/221 |
| 5,943,617 A | | 8/1999 | Nakamura .................. 455/423 |
| 6,137,830 A | * | 10/2000 | Schneider et al. .......... 375/224 |
| 6,549,758 B1 | * | 4/2003 | Matturi et al. ........... 455/67.13 |

FOREIGN PATENT DOCUMENTS

| | | |
|---|---|---|
| EP | 0712258 A3 | 5/1996 |
| FI | 107862 B | 9/2000 |

OTHER PUBLICATIONS

*Corresponds to WO 00/51380, front page of which is attached.

* cited by examiner

*Primary Examiner*—Dac V. Ha
(74) *Attorney, Agent, or Firm*—Perman & Green, LLP

(57) ABSTRACT

The invention pertains in general to the testing of the operation of radio and other data transmission apparatus. In particular the invention pertains to the testing of the operation of a digital radio apparatus on the basis of error statistics. In order to test functions relating to data transmission, a simulation system produces a pseudorandom bit sequence or some other test sequence which is packed into downlink frames and sent to the data transmission apparatus tested. In accordance with the invention, a known number of errors are generated in the test sequence. As the data transmission apparatus tested compares the received test sequence to the sequence it has produced, it detects the errors in the received sequence and compiles various error statistics, e.g., in the form of bit error ratio (BER) or frame erasure ratio (FER). An uplink connection is used to send these statistical data to the simulation system which examines whether the information produced by the data transmission apparatus tested matches the simulation system's information about the erroneousness of the sequence sent downlink.

9 Claims, 2 Drawing Sheets

METHOD AND SYSTEM FOR TESTING THE FUNCTIONING OF A TESTING ALGORITHM IN A DATA TRANSMISSION APPARATUS

TECHNOLOGICAL FIELD

The invention relates in general to the testing of the operation of radio and other data transmission apparatus. In particular the invention relates to the testing of the operation of a digital radio apparatus on the basis of error statistics. The description of the invention especially focuses on type approval testing of the operation of a radio apparatus but the operation of radio and other data transmission apparatus is of course tested in many other contexts as well, e.g. during product development, manufacture, repair and service. In addition, the invention is applicable even during the normal use of the radio or other data transmission apparatus.

BACKGROUND OF THE INVENTION

New digital radio apparatus (digital mobile phones, for example) intended for operation in public data transmission networks are tested for type approval prior to being introduced into the market. The equipment and methods used the testing are usually defmed in data transmission network standards. FIG. 1 illustrates a known test arrangement in which testing is directed to a mobile station (MS) 101 of a cellular radio system. The mobile station may also be called user equipment (UE). A simulation system (SS) 102 simulates a cellular radio system during the test. In this application such a system is called a simulation system or testing system. Testing the functioning of data transmission requires that an active data link 103 be set up between the SS and MS, which may be a radio link or a wire link through a testing interface at the mobile station.

Tests usually apply a technique in which a mobile station receives a downlink frame from the SS and sends back to the SS a corresponding uplink frame which contains the equivalent number of bits. The mobile station may even recycle to the SS the same individual bits that it received in the downlink direction. The SS examines whether the transmission or the operation of the mobile station caused errors in the frame. Arrow 104 depicts the loopback. The arrangement has been suitable for testing the mobile stations of known cellular radio systems since in the known systems the data transmission links are bidirectional and their capacity is distributed symmetrically: the capacities of uplink and downlink data transmission are equal. In mobile stations of new cellular radio systems, however, it is necessary to test functions that involve asymmetric distribution of data transmission capacity between uplink and downlink transmission. Moreover, mobile stations of new cellular radio systems may include functions based on unidirectional downlink data transmission the testing of which is naturally impossible using the method according to the prior art.

From an earlier Finnish patent application no. 981267 by the applicant, which application has not become public by the priority date of this present application, it is known an alternative testing procedure suitable for the testing of data transmission arrangements with asymmetric capacities. In said procedure a mobile station selects from the bits of the downlink frame only a portion which is looped back to the uplink frames. The disadvantage of such an arrangement is that errors in those bits of the downlink frame that are not looped back uplink will remain undetected. In addition, this arrangement, too, is unsuitable for testing unidirectional downlink data transmission links.

From an earlier Finnish patent application no. 990690 by the applicant, which application has not become public by the priority date of this present application, it is known a testing procedure in which the mobile station tested does not need to recycle the transmitted data back uplink. This procedure is based on the fact that the mobile station can produce the same pseudorandom test sequence that the SS includes in the test frames sent downlink. The mobile station compares the test sequence received to the sequence it has produced, produces statistics of the errors detected in the sequence received, and sends uplink to the SS the quantity or errors detected and/or a parameter representing the quantity of errors. A disadvantage of this testing procedure is that it depends on the operation of the algorithm used by the mobile station to produce the reference sequence and detect errors.

SUMMARY OF THE INVENTION

An object of the present invention is to provide a method for testing the operation of a digital data transmission apparatus, in which method the dependence on the correct internal functioning of the data transmission apparatus is lesser than in the procedure according to the prior art described above. Another object of the invention is to provide the equipment needed to implement the method according to the invention.

The objects of the invention are achieved by examining how the data transmission apparatus tested processes a test sequence the erroneousness of which is known.

The method according to the invention is characterized in that it is comprised of steps in which a first test sequence is produced, known errors are generated in the test sequence to produce a second test sequence, the second test sequence is sent to the data transmission apparatus tested, the data transmission apparatus tested produces a third test sequence corresponding to the first test sequence, the data transmission apparatus tested compares the second test sequence to the third test sequence to detect differences between the test sequences, and the data transmission apparatus tested sends to the simulation system information representing the differences detected.

The invention is also directed to a test equipment which is characterized in that it comprises a test sequence generator to produce a test sequence, an error generator to produce errors in said test sequence, and a comparison circuit to compare the errors produced with errors detected by the data transmission apparatus tested.

In order to test functions relating to data transmission the simulation system produces a pseudorandom bit sequence or other test sequence which is packed into downlink frames and sent to the data transmission apparatus tested. In accordance with the invention a known number of errors are produced in the test sequence. The test sequence is sent to the data transmission apparatus tested preferably under signal propagation conditions so good that it is unlikely that the quantity or quality of errors would substantially change prior to that point in the data transmission apparatus tested where the correctness of the received sequence is analyzed. When the data transmission apparatus tested compares the received test sequence to the sequence it has produced itself it detects the errors in the received sequence and produces various error statistics in the form of bit error ratio (BER) or frame erasure ratio (FER), for example. Such generation of error statistics can be realized in the same way as described in the applicant's earlier application mentioned above. The uplink connection is used to convey these statistics to the simulation system which examines whether the information provided by the data transmission apparatus tested matches the simulation system's information about the erroneousness of the sequence sent downlink.

The method according to the invention does not call for a high uplink transmission capacity since the only information sent uplink is the information about the errors detected in the received test sequence by the data transmission apparatus tested. The uplink data connection need not be associated with the downlink data connection at all. A so-called Bluetooth link has been proposed for new electronic apparatus to provide a short-range wireless data link between at least two apparatus. The data transmission apparatus tested can send information about the analysis results to the test equipment via the Bluetooth link. Naturally the uplink channel of a bidirectional data connection can be used in the uplink direction, if one is available.

The testing method according to the invention is also relatively independent of the internal functions of the data transmission apparatus tested since the comparison of detected and known errors in the testing system does not depend on the error detection method used by the data transmission apparatus tested. The testing system may vary the quantity and quality of errors generated in the test sequence so that it can be examined how well the data transmission apparatus detects errors of various types.

The invention does not limit the amount of information sent uplink by the data transmission apparatus tested to report detected and statistically processed errors. However, the method according to the invention is at its most efficient when the information sent uplink represents the detected and processed errors relatively accurately, e.g. in such a manner that the data transmission apparatus tested reports separately the measured bit error ratio of each downlink frame.

BRIEF DESCRIPTION OF DRAWINGS

The invention is below described in more detail referring to the preferred embodiments presented by way of example and to the accompanying drawings in which.

Figure 1:
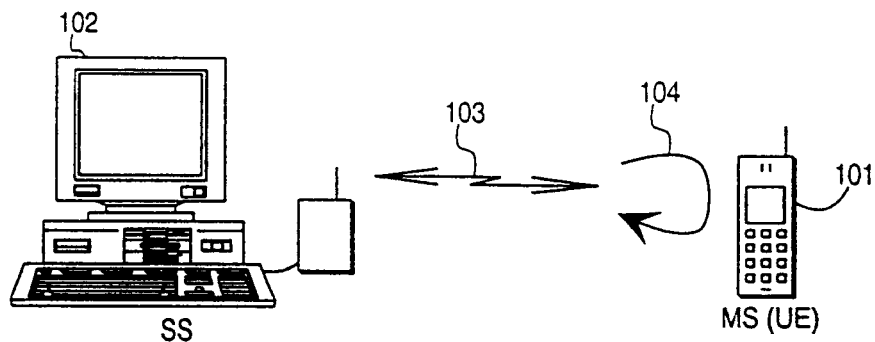
FIG. 1 illustrates testing according to the prior art.

Above in connection with the description of the prior art reference was made to FIG. 1, so below in the description of the invention and its preferred embodiments reference will be made mainly to FIGS. 2 and 3.

DETAILED DESCRIPTION OF THE INVENTION

Figure 2:
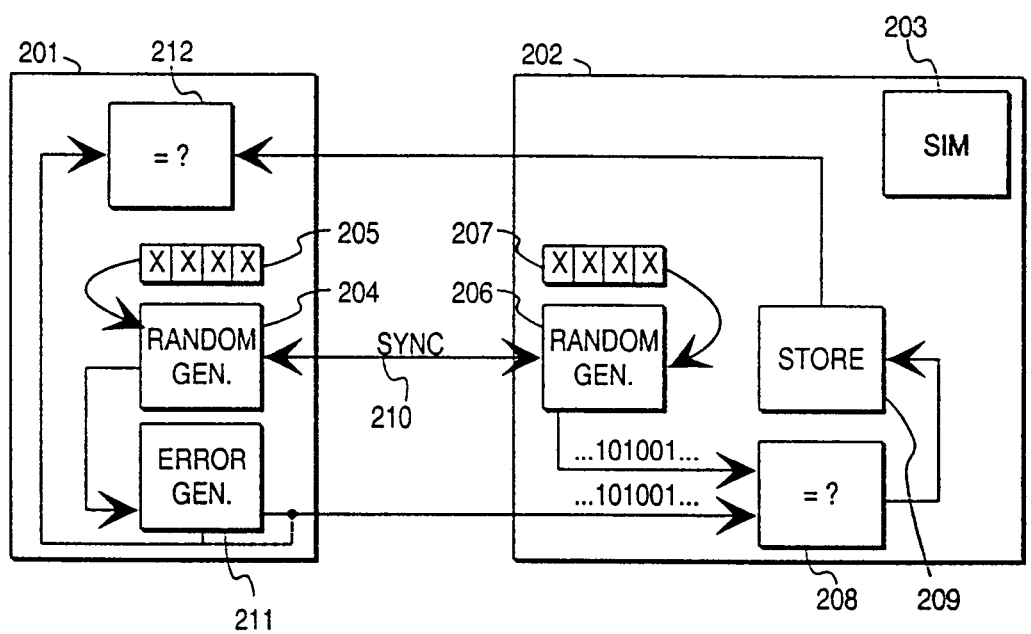
FIG. 2 illustrates the principle of the invention.

FIG. 2 shows an arrangement in which a mobile station 202 of a digital mobile communications system, which mobile station is to be tested, is connected in a known manner to test equipment 201. It is usually advantageous from the testing standpoint that the mobile station 202 be equipped with a subscriber identity module (SIM) 203 designed specifically for testing purposes, which SIM may be a smart card like the SIM card widely used in mobile stations or a special SIM simulator which establishes the necessary connections between the SIM interface at the mobile station and a special equipment simulating the operation of a SIM. However, the invention does not require the use of any one particular SIM.

In a known manner the test equipment 201 comprises a test sequence generator 204 which is initialized using a certain so-called seed 205 and which then produces a pseudorandom test sequence. The mobile station comprises a functionally identical test sequence generator 206 which also is initialized using a certain seed 207. It follows from the general principles applying to pseudorandom test sequence generators that if the seeds 205 and 207 are identical, generators 204 and 206 will produce exactly identical pseudorandom test sequences.

The mobile station 202 also comprises a comparison circuit 208 and statistical unit 209 which are adapted so as to compare bit by bit the test sequence received from the test equipment to the locally produced test sequence and to compile statistics of the differences detected. In addition, there is an uplink connection from the statistical unit 209 back to the test equipment so that the resulting statistics can be sent to the test equipment. This connection may be an uplink channel in the same data connection via which the downlink signal was sent from the test equipment 201 to the mobile station 202 or it may be some other connection such as a Bluetooth connection.

For the comparison of pseudorandom test sequences to be meaningful, the test sequence generators 204 and 206 must operate in a synchronized manner, i.e. they have to generate the same bits at the same pace. The synchronization of the generation of test sequences is known per se because in spread spectrum technology in general and specifically in code division multiple access (CDMA) methods the differentiation of a given utility signal from rivaling utility signals and noise is based on using one and the same pseudorandom spreading sequence at both the transmitting and receiving end. In connection with the invention it is possible to use a known technique to synchronize the generation of the test sequences. In FIG. 2, synchronization is schematically depicted by an arrow 210.

Through the uplink connection it is possible to send e.g. a stored bit error ratio or frame erasure ratio value or a value derived from them, such as a mean bit error ratio over a time span. Many applications are only interested in whether the bit error ratio or frame erasure ratio stays below a predetermined limit, in which case only a yes/no type answer (is smaller than limit value/is not smaller than limit value) need be sent uplink. Since limit values are usually defined as exponential numbers (say, $1.0 \cdot 10^{-6}$), one possibility is to sent uplink the exponent x of the number $1.0 \cdot 10^{-x}$ which represents the upper limit value of the observed bit error ratio. Thus e.g. number −6 sent uplink would indicate that the observed bit error ratio is smaller than $1.0 \cdot 10^{-6}$.

In accordance with the invention the test equipment includes an error generator 211 operating in a controlled manner such that it can produce a certain known erroneousness in any given test sequence. The error generator 211 can produce errors in a test sequence partly pseudorandomly, i.e. in such a manner that a given portion of the test sequence has an exact known number of errors but their placement within that portion is random. The error generator 211 may also operate in such a manner that it produces an exact specified bit error pattern which e.g. has at K-bit intervals a period of N bits, where the value of every $M^{th}$ bit is changed. Here, K, N and M are positive integers, whereby the control circuit (not shown) controlling the operation of the error generator can accurately control the generation of errors by providing the error generator with the desired K, N and M values. Many combinations and modifications of these techniques are also possible.

In accordance with the invention the test equipment also includes a comparison circuit 212 which is informed about how many and what kind of errors the test sequence includes at the moment of sending to the mobile station in downlink data transmission frames. This information may come from the error generator control data, as depicted in FIG. 2 by a continuous line, or the comparison circuit 212 may receive copies of the downlink frames delivered to the mobile station tested. The latter option is depicted in FIG. 2 by a broken line. When the mobile station tested sends to the test equipment the information about the detected errors, the information is directed to the comparison circuit 212 in the test equipment. The comparison circuit 212 can then examine whether the information from the mobile station tested matches the information representing the erroneousness of the test sequence at the moment of sending.

The earlier Finnish patent application no. 990690 by the applicant, mentioned above in the description of the prior art, discloses various options to realize a test loop in the mobile station tested. A test loop refers to those parts of the hardware and software implementation that in the mobile station tested realize the functions for receiving, demodulating and decoding the test sequence, detecting and processing errors, and for sending the error data to the test equipment. The present invention does not set any additional requirements on the mobile station tested but it can operate exactly as disclosed in said earlier application.

The earlier application mentioned above as well as an earlier Finnish patent application no. 981267 by the applicant also discuss the advantages achieved if the test loop is produced without contribution from certain upper protocol layers. This refers particularly to a so-called mobility management (MM) layer and protocol layers above it in protocol stacks intended for connection set-up and management. The present invention is independent of the protocol layers used for setting up and managing the test connection. The invention does well e.g. when using a procedure based on the utilization of lower protocol layers only, as described in the applications mentioned above.

Figure 3:
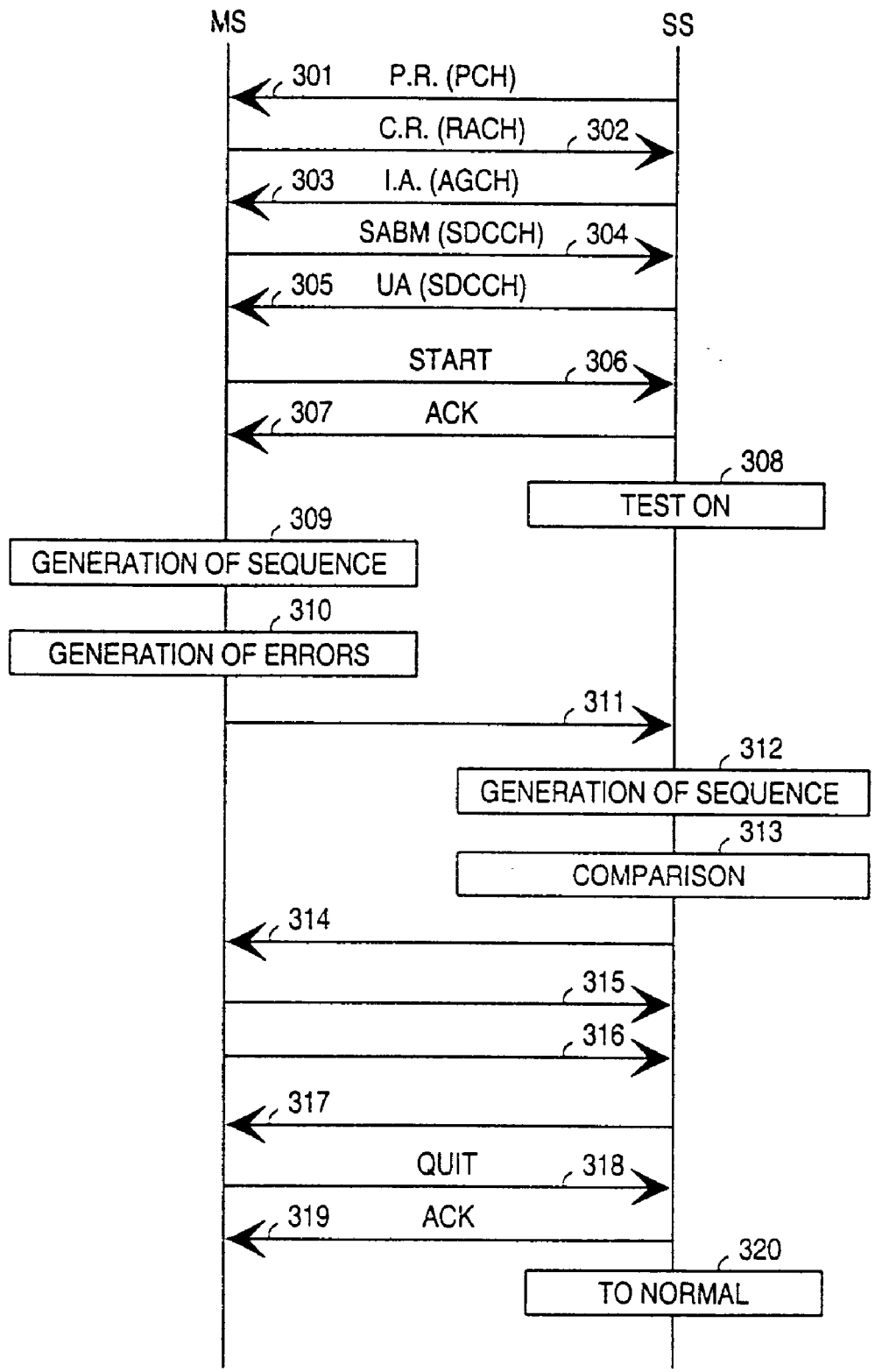
FIG. 3 illustrates the method according to the invention in testing.

FIG. 3 shows an exemplary testing method applying the invention. The mobile station tested is connected in a known manner to the test equipment and test SIM. A mobile terminating (MT) radio link is established between the mobile station and test equipment in accordance with FIG. 3. When the mobile station is on, the test equipment sends to it on a PCH channel a paging request 301, to which the mobile station responds with a channel request 302 sent on a RACH channel. After that, the test equipment sends an immediate assignment 303 which may include various instructions for the mobile station. The mobile station sends to the test equipment a set asynchronous balanced mode (SABM) message 304 which in fact is a paging response and is sent on a SDCCH channel. The test equipment acknowledges the SABM message using an unnumbered acknowledge (UA) 305.

The contents and syntax of the messages shown in FIG. 3 are mainly defined in specification GSM 04.08. However, some messages have portions reserved for future extensions, which portions can be used to utilize the messages for the present invention. Particularly the immediate assignment 303 contains so-called rest octets in which the first two bits indicate the contents of the rest of the rest octet. By the priority date of this patent application, values 11 and 10 of the values of the first two bits of the rest octet have been reserved but values 01 and 00 are unused. In accordance with a preferred embodiment of the invention at least one of these values can be reserved to indicate that in response to the immediate assignment 303 the mobile station to be tested has to set itself in a special test mode. The test mode is advantageously defined such that even though an RR-level link between the mobile station and test equipment has already been established, the RR layer in the mobile station's protocol stack will not inform the upper MM layer about the link. As the MM layer and higher protocol layers do not know about the existence of the radio link, they will not try to disconnect the link because of a supervising mechanism which would e.g. attempt to monitor the error status of the connection.

So test mode means that the mobile station to be tested is instructed to maintain a connection on a certain transmission channel. The mobile station is kept in the test mode by Layer 3 signaling. Defining the test mode as described above and realization of the definition in practice can be easily implemented by a person skilled in the art since the operation of the mobile station is totally controlled by its control block. The control block in turn is a microprocessor which executes a program stored in the memory means available to it. When this program is written such that in response to the reception of a certain Layer 3 command no notification is sent to upper protocol layers, the mobile station can be made to function in the desired manner according to the invention.

When a connection has been established, the test equipment can send to the mobile station tested any commands that do not require that upper protocol layers, which do not know about the connection, participate in the communication. Below it is simply assumed that the test equipment sends a start comparison and processing command START 306 which may include various identifiers, e.g. to specify the point in the mobile station tested at which the statistical processing of errors should be carried out. For the test equipment to be able to verify that a message sent by it has been received it advantageously starts a timer in connection with the sending, in which case the mobile station must send an acknowledge before the timer expires. The mobile station acknowledges the message using an acknowledge message ACK 307. The mobile station activates 308 the test loop in a certain time after sending the acknowledge.

When the test loop is activated at the mobile station tested, the test equipment can start to send test data, i.e. blocks of a pseudorandom test sequence packed into downlink frames such that errors are generated in said blocks in a known manner. To that end, the test equipment produces 309 a first test sequence, generates 310 known errors in it, and sends 311 the resulting second test sequence to the mobile station tested. The mobile station tested produces 312 a third test sequence corresponding to the first test sequence and compares 313 the second test sequence to the third test sequence in order to detect the differences between the test sequences. The mobile station tested responds to the test equipment by sending to it information that represents errors detected in the received signal. This is depicted by an arrow 314 in FIG. 3. As the purpose is to test the detection of errors at the mobile station, the test data is advantageously sent to the mobile station at a relatively high signal strength and under optimal signal propagation conditions so that no errors are likely to be generated in the test data during the transmission.

Arrows 315 and 316 depict the sending of test data at different "error levels". Errors can be generated in the test data e.g. in greater or smaller quantities, or the errors may follow various occurrence patterns (regularly/irregularly, evenly/burstily etc.). The invention does not limit the actual placement of errors in the test data. Arrow 317 depicts the retransmission by the mobile station tested of information representing the errors detected in the received signal.

When the test loop is active the mobile station compares the received test sequence blocks to the locally produced blocks and measures e.g. the bit error ratio or frame erasure ratio and compiles statistics of the measurement results in a desired manner. Complete statistics or information elements representing the reception error status in general are sent back uplink to the test equipment. The test equipment receives the uplink frames sent by the mobile station and demodulates and decrypts them so that the statistical results in the received frame can be processed by the test equipment.

At the end of the test the test equipment may instruct the mobile station to quit the test loop by sending a special command QUIT, depicted by arrow 318 in FIG. 3. The mobile station quits the test loop and acknowledges the message with an acknowledge message ACK, depicted by arrow 319. In connection with the quitting of the test loop the mobile station returns 320 from the test mode to the normal operating mode.

The names and specifications mentioned in this patent application associated with a particular system, hardware or message are given by way of example only and do not affect the applicability of the invention to all mobile communications systems in which a mobile station can operate on data, traffic and control channels. Examples of such systems include but are not in any way restricted to the GSM (Global System for Mobile telecommunications) and UMTS (Universal Mobile Telecommunication System). The invention can also be modified in many ways without departing from the scope of the invention defined by the claims attached hereto. For example, in a modification of the invention the activation of a test loop and setting of the mobile station into test mode as well as the quitting of the test loop and returning of the mobile station into normal mode may be realized in a manner other than through a command sent by the test equipment. It can even be thought that these functions are activated manually by setting a switch or connector in the mobile station into a desired position. However, from the smoothness of testing and automatization perspective it is advantageous that these functions can be realized by commands sent by the test equipment.

What is claimed is:

1. A method for testing the operation of a digital data transmission apparatus by means of test equipment, comprising the steps of:
   producing a first test sequence,
   generating known errors in the first test sequence to produce a second test sequence,
   sending the second test sequence to the digital data transmission apparatus the operation of which is tested,
   producing, within the digital data transmission apparatus, a third test sequence corresponding to the first test sequence, comparing in the digital data transmission apparatus, the second test sequence to the third test sequence in order to detect differences between the second and third test sequences, and
   sending from the data transmission to the test equipment information representing the differences detected between the second and third test sequences.

2. A method according to claim 1, wherein the step of sending from the data transmission to the test equipment information representing the differences comprises the step of sending from the data transmission to the test equipment information representing the bit error ratio observed in the second test sequence.

3. A method according to claim 1, wherein the step of sending from the data transmission to the test equipment information representing the differences comprises the step of sending from the data transmission to the test equipment information representing the frame erasure ratio observed in the second test sequence.

4. A test equipment for testing the operation of a digital data transmission apparatus, comprising:
   a test sequence generator for producing a test sequence,
   an error generator for generating errors in said test sequence, and
   a comparison circuit for comparing the errors generated in said test sequence to a piece of error information received from a digital data transmission apparatus the operation of which is tested.

5. A test equipment according to claim 4, wherein the error generator is arranged so as to generate in a test sequence block a predetermined number of errors at random positions of said test sequence block.

6. A test equipment according to claim 4, wherein the error generator is arranged so as to generate a predetermined bit error pattern.

7. A test equipment according to claim 4, wherein the test equipment is adapted so as to test mobile stations of a digital mobile communications system.

8. A test equipment for testing the operation of a digital data transmission apparatus, comprising:
   a test sequence generator for producing a test sequence,
   an error generator for generating errors in said test sequence, and
   a comparison circuit for comparing the errors generated in said test sequence to a piece of error information received from a digital data transmission apparatus the operation of which is tested wherein the error generator is arranged so as to generate in a test sequence block a predetermined number of errors at random positions of said test sequence block.

9. A test equipment according to claim 8, wherein the test equipment is adapted so as to test mobile stations of a digital mobile communications system.

* * * * *